(12) United States Patent
Zhu et al.

(10) Patent No.: US 12,015,528 B2
(45) Date of Patent: Jun. 18, 2024

(54) MULTI-FUNCTIONAL INTEGRATED NETWORK MODAL MANAGEMENT SYSTEM AND MANAGEMENT METHOD FOR USER-DEFINED NETWORK MODAL

(71) Applicant: ZHEJIANG LAB, Zhejiang (CN)

(72) Inventors: Jun Zhu, Hangzhou (CN); Tao Zou, Hangzhou (CN); Lei Xue, Hangzhou (CN); Hanguang Luo, Hangzhou (CN); Qi Xu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/348,315

(22) Filed: Jul. 6, 2023

(65) Prior Publication Data
US 2024/0022480 A1    Jan. 18, 2024

Related U.S. Application Data

(63) Continuation of application No. PCT/CN2022/125331, filed on Oct. 14, 2022.

(30) Foreign Application Priority Data

Jul. 14, 2022 (CN) .......................... 202210826286.3

(51) Int. Cl.
    *H04L 41/12* (2022.01)
(52) U.S. Cl.
    CPC .................... *H04L 41/12* (2013.01)
(58) Field of Classification Search
    CPC ...................................................... H04L 41/12
    See application file for complete search history.

(56) References Cited

U.S. PATENT DOCUMENTS

| | | |
|---|---|---|
| 11,126,415 B1 | 9/2021 | Mestery et al. |
| 2019/0260682 A1* | 8/2019 | Ewert ................ H04L 41/0806 |

(Continued)

FOREIGN PATENT DOCUMENTS

| | | |
|---|---|---|
| CN | 108111332 A | 6/2018 |
| CN | 112235130 A | 1/2021 |

(Continued)

OTHER PUBLICATIONS

International Search Report (PCT/CN2022/125331); dated Mar. 16, 2023.

(Continued)

*Primary Examiner* — Hee Soo Kim
(74) *Attorney, Agent, or Firm* — W&G Law Group

(57) ABSTRACT

Provided is a network modal management system and a management method. The system includes a polymorphic intelligent network integrated development environment and a polymorphic intelligent network distributed compilation and deployment environment. The polymorphic intelligent network integrated development environment provides users with an environment for writing code and configuration files, and facilitates users to debug the code. The polymorphic intelligent network distributed compilation and deployment environment provides users with a management interface and services, and integrates various functions related to network modal. The network modal management system significantly improves the management efficiency of polymorphic intelligent network platforms.

10 Claims, 5 Drawing Sheets

(56) References Cited

U.S. PATENT DOCUMENTS

| | | | |
|---|---|---|---|
| 2019/0384580 A1* | 12/2019 | Martini | H04L 41/082 |
| 2020/0021512 A1* | 1/2020 | Naskar | H04L 43/20 |
| 2022/0021609 A1* | 1/2022 | Varghese | G06F 8/315 |
| 2022/0091823 A1* | 3/2022 | Wells | H04L 41/0895 |
| 2022/0091836 A1* | 3/2022 | Mestery | H04L 67/52 |
| 2022/0164237 A1* | 5/2022 | King | G06F 8/71 |
| 2022/0166666 A1* | 5/2022 | Jain | H04L 41/0663 |
| 2022/0174005 A1* | 6/2022 | Limaye | H04L 45/38 |

FOREIGN PATENT DOCUMENTS

| | | | |
|---|---|---|---|
| CN | 112565094 A | 3/2021 | |
| CN | 113691416 A | 11/2021 | |
| CN | 113938303 A | 1/2022 | |
| CN | 114115834 A | 3/2022 | |
| CN | 115098156 A | 9/2022 | |

OTHER PUBLICATIONS

Notice Of Allowance(CN202210826286.3); dated Oct. 9, 2022.
An Efficient Algorithm to Determine the Connectivity of Complex Directed Networks.
SDN-Deployment-in-Cloud-Computing-Data-Center.

* cited by examiner

MULTI-FUNCTIONAL INTEGRATED NETWORK MODAL MANAGEMENT SYSTEM AND MANAGEMENT METHOD FOR USER-DEFINED NETWORK MODAL

CROSS-REFERENCE TO RELATED APPLICATIONS

The present application is a continuation of International Application No. PCT/CN2022/125331, filed on Oct. 14, 2022, which claims priority to Chinese Application No. 202210826286.3, filed on Jul. 14, 2022, the contents of both of which are incorporated herein by reference in their entireties.

TECHNICAL FIELD

The present disclosure relates to the field of computer networks, in particular to a network modal management system and a management method.

BACKGROUND

With the deep integration and development of information networks and various fields of economy and society, it has brought various professional and personalized business service bearing requirements. At present, it has become the consensus of academia and manufacturers to deploy user-defined network modals on a unified network infrastructure quickly and efficiently by a Software Defined Network (SDN).

The deployment and operation of network modals depends on the basic network platform of a polymorphic intelligent network. The polymorphic intelligent network, based on the full-dimensional definability of a network structure, is a network architecture with polymorphic presentation of network functions at all levels, which supports the full-dimensional definition and polymorphic presentation such as routing addressing, switching mode, interconnection mode, network element morphology, transmission protocol, supports the evolutionary development of the Internet, and fundamentally meets the business needs for network intelligence, diversification, personalization, high robustness and high efficiency.

However, at present, the user-defined network modal lacks the support of software management methods, and does not have basic management functions such as installation, query, condition monitoring, uninstallation and modification, which leads to many inconveniences for users during the use of network modals and is not conducive to the development and debugging of network modals by developers.

From the technical point of view, at present, the management of network modals is mainly achieved in a manual manner, and the program files corresponding to the network modal that need to be deployed and installed are distributed, compiled and installed on multiple network node equipments by developers or network managers. When the network modal is no longer used, it also needs to be manually uninstalled from all the network node equipments installed with the network modal.

Therefore, the following problems exist in the prior art:
1) Without a unified management method and system for network modal installation and deployment, it is impossible to intuitively display the deployment state of the network modal, or to perform management operations such as installation, uninstallation and modification of the network modal.
2) At present, network administrators need to compile and deploy the network modal on each network node equipment, and whenever the increase, decrease or modification of network modals is involved, all related network node equipments will be involved, and all network node equipments in the network need to be managed accordingly, and the whole operation process is complicated and tedious, which consumes a large labor cost.
3) Since each network node equipment needs to support different network modals, it is necessary to write corresponding network modal codes for each network node equipment.

SUMMARY

In view of the shortcomings of the prior art, the present disclosure provides a network modal management system and a management method, which are used for flexibly and efficiently managing the functions of installation, inquiry, state monitoring, modification, uninstallation and the like of user-defined network modals on a network infrastructure, changing the backward network modal management method in the past, eliminating the inconvenience for network managers in the network modal management work, and significantly improving the management efficiency of polymorphic intelligent network platforms.

The object of the present disclosure is achieved by the following technical solutions.

A network modal management system includes a polymorphic intelligent network integrated development environment and a polymorphic intelligent network distributed compilation and deployment environment.

The polymorphic intelligent network integrated development environment includes an editor, a modal development auxiliary module and a network modal deployment file packaging tool; the editor provides a user with written network modal codes and a corresponding configuration file, and the configuration file covers network topology, deployment nodes and network modal parameters; the modal development auxiliary module provides a modal development auxiliary function for the user to write, debug and test network modal codes; the network modal deployment file packaging tool is configured to package a network modal source code file and a corresponding configuration file into a network modal deployment file.

The polymorphic intelligent network distributed compilation and deployment environment includes a polymorphic intelligent network modal package manager deployed on a network controller server and a network node equipment network modal package manager deployed on a network node equipment.

The polymorphic intelligent network modal package manager is used to provide a unified network modal package management interface and service for a polymorphic intelligent network user; record and display a related deployment status of a network modal package in a polymorphic intelligent network; support the import and installation of the network modal deployment file; support the uninstallation and modification of an installed network modal; coordinate a deployment management operation of the network modal deployment file on a plurality of network node equipments.

The network node equipment network modal package manager includes a data plane network modal package distribution and compilation tool, which is used to transmit the network modal deployment file and a network modal configuration file of the network node equipment to a plurality of forwarding module platforms and control the compilation and deployment of the network modal deployment file on each of the forwarding module platforms.

A network modal management method is implemented based on the network modal management system, and the method includes installing, uninstalling and modifying processes of a network modal.

Installation of the network modal comprises: installing and deploying a user-defined network modal to a network node equipment in a polymorphic intelligent network environment in a distributed manner.

Uninstallation of the network modal includes: removing the installed network modal from the polymorphic intelligent network environment.

Modification of the network modal includes: modifying the installed network modal.

The present disclosure has the following beneficial effects:

1) The network modal management system and management method of the present disclosure realize a unified management of network modals in a polymorphic intelligent network, and realize a unified management of different network node equipments in the network on one management interface, thus avoiding the problem that network managers operate on each device one by one, resulting tremendous manpower and working hours.
2) The network modal management system of the present disclosure uniformly coordinates the compilation and deployment of source code files on various network node equipments and different target forwarding modules on the devices, and can automatically distribute the deployment files to all network node equipments in the network.
3) The network modal management system of the present disclosure firstly compiles the source code files and configuration files of different network modals in an integrated development environment, and automatically generates corresponding network modal codes for each network node equipment according to the network configuration, thus avoiding writing the corresponding network modal codes for each network node equipment separately.

DESCRIPTION OF EMBODIMENTS

Figure 1:
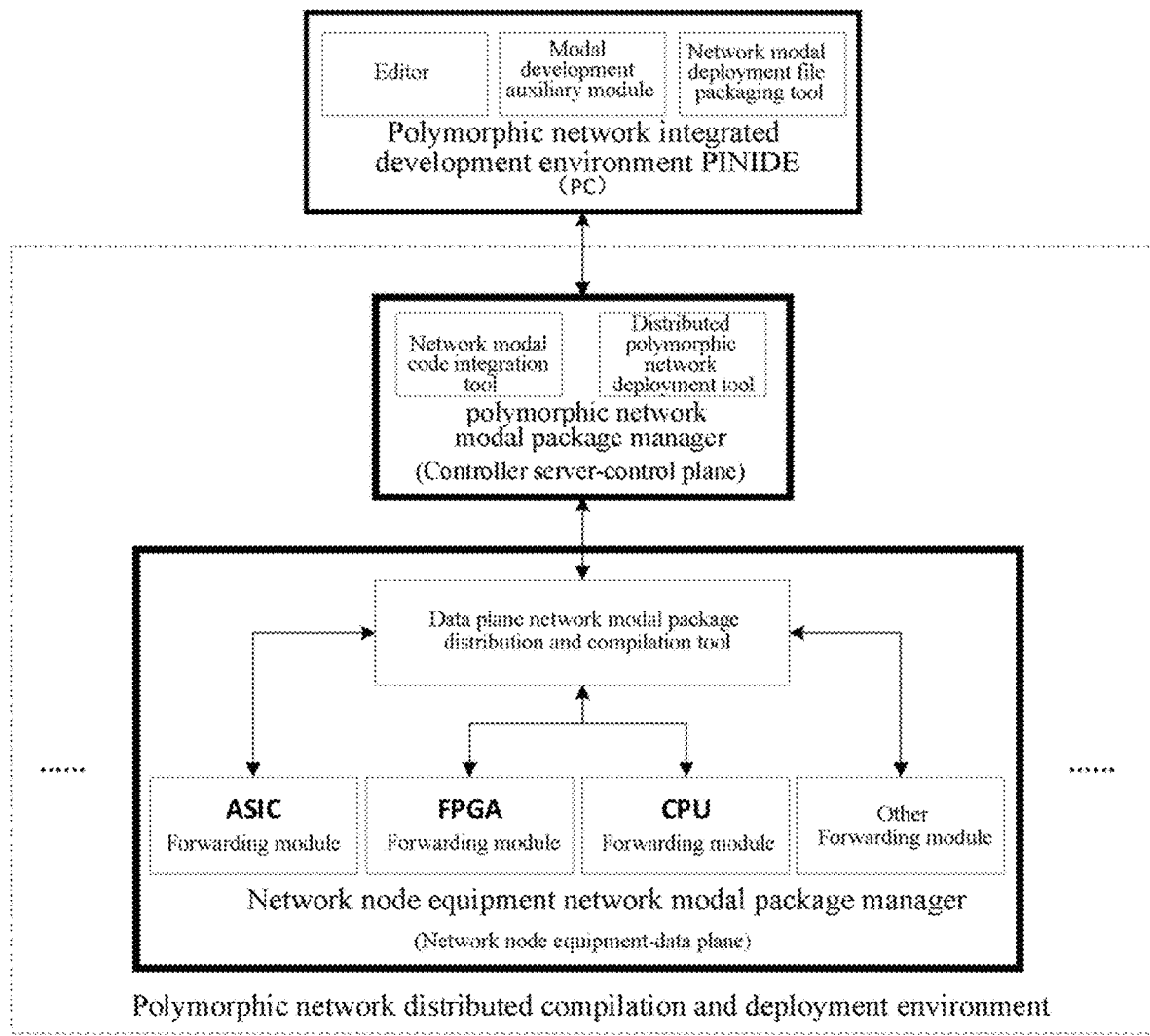
FIG. 1 is an architectural block diagram of a network modal management system according to an exemplary embodiment.

As shown in FIG. 1, the network modal management system shown in this embodiment includes a polymorphic intelligent network integrated development environment and a polymorphic intelligent network distributed compilation and deployment environment.

Among them, the polymorphic intelligent network integrated development environment (hereinafter referred to as PINIDE) includes an editor, a modal development auxiliary module and a network modal deployment file packaging tool; the editor provides a user with written network modal codes and a corresponding configuration file, and the configuration file covers network topology, deployment nodes and network modal parameters; the modal development auxiliary module provides modal development auxiliary functions for the user to write, debug and test network modal codes, such as lexical check, syntax check, behavior simulation, function debugging, resource evaluation and other functions; the network modal deployment file packaging tool is integrated in the PINIDE as a tool to package the network modal source file .p4 and the corresponding configuration file .xml into a network modal deployment file (a par package).

The polymorphic intelligent network distributed compilation and deployment environment includes a polymorphic intelligent network modal package manager deployed on a controller server and a network node equipment network modal package manager deployed on a network node equipment.

Among them, the polymorphic intelligent network modal package manager is used to provide a unified network modal package management interface and service for a polymorphic intelligent network user; record and display a related deployment status of a network modal package in a polymorphic intelligent network; support the import and installation of the network modal deployment file; support the uninstallation and modification of an installed network modal; coordinate a deployment management operation of the network modal deployment file on a plurality of network node equipments.

The polymorphic intelligent network modal package manager includes a network modal code automatic integration tool and a distributed polymorphic intelligent network deployment tool.

Among them, the network modal code automatic integration tool is used to extract source codes of various network modals from the polymorphic intelligent network modal package manager and unpack to form a network modal source code file and a corresponding configuration file; carry out lexical and grammatical analysis on the extracted network modal source codes; automatically integrate a plurality of network modal source code files into a unified network modal deployment source code file; and generate a network modal configuration file of the corresponding network node equipment for each network node equipment according to the extracted configuration file.

The distributed polymorphic intelligent network deployment tool is used to distribute the unified network modal deployment source code file and the network modal configuration file of the corresponding network node equipment to each network node equipment according to a network modal configuration; and monitor network modal deployment of each network node equipment in a data plane.

The network node equipment network modal package manager includes a data plane network modal package distribution and compilation tool, which is used to transmit the network modal deployment file and a network modal configuration file of the network node equipment to a plurality of forwarding module platforms, including but not limited to an ASIC forwarding module, a CPU forwarding module, an FPGA forwarding module and the like.

Figure 2:
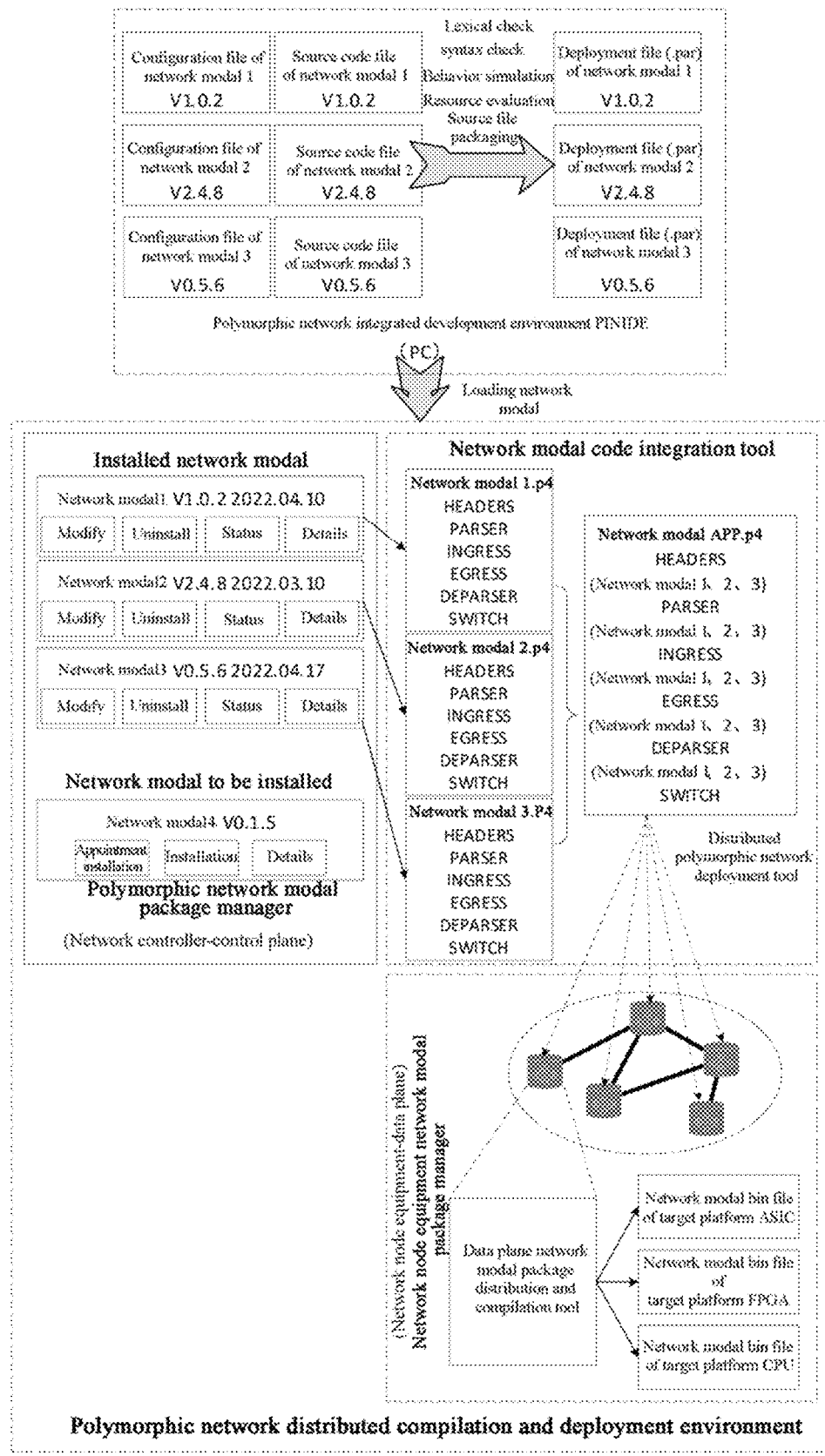
FIG. 2 is a basic schematic diagram of a network modal management method according to an exemplary embodiment.

As shown in FIG. 2, the network modal management method of this embodiment includes the installation, uninstallation and modification processes of a network modal;

I, Installation of Network Modal

Figure 3:
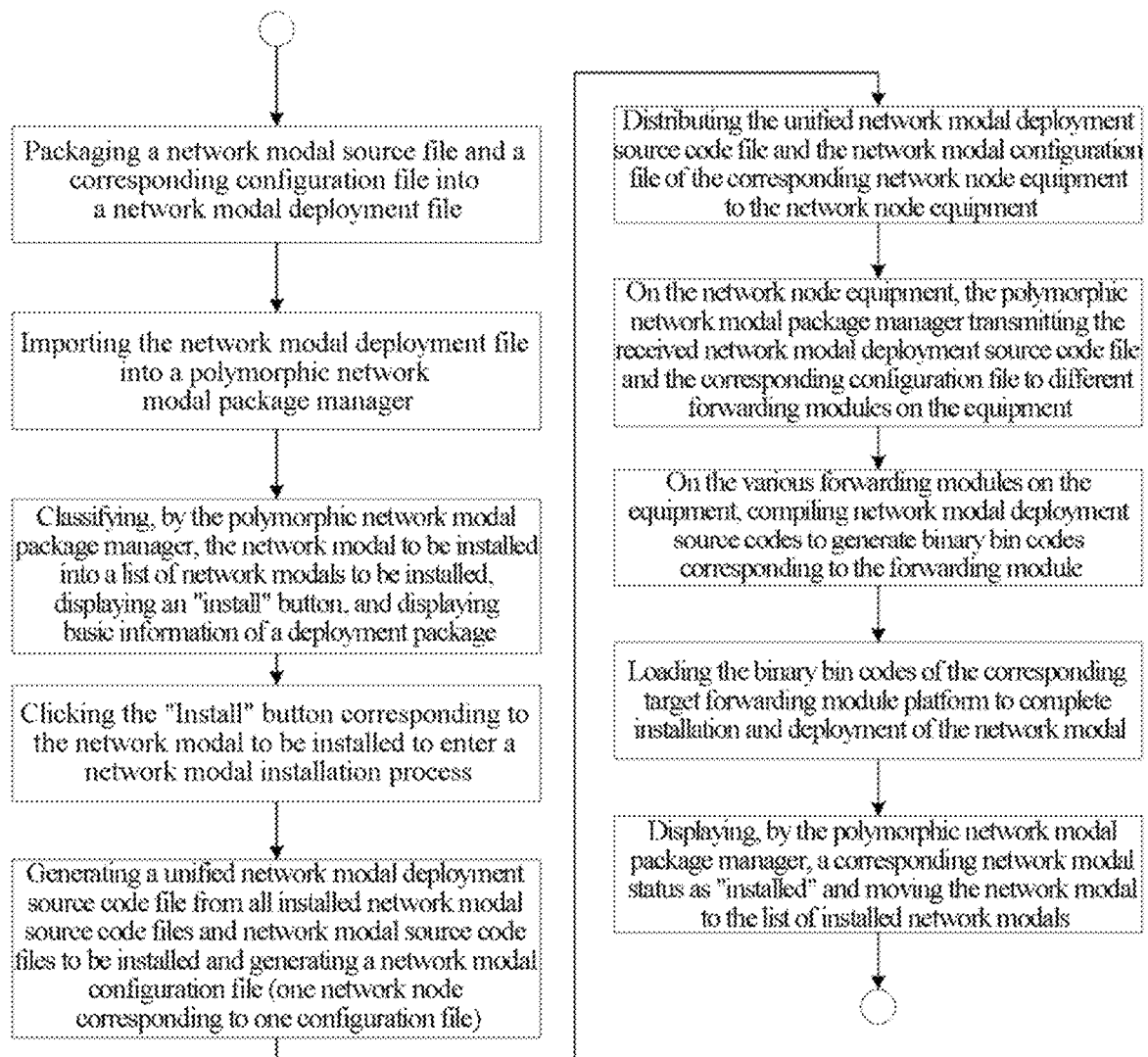
FIG. 3 is a schematic diagram of the installation and deployment process of a network modal.

A user-defined network modal developed by a user is installed and deployed on a network node equipment in a polymorphic intelligent network environment in a distributed manner, as shown in FIG. 3, which specifically includes the following sub-steps:

(1) A network modal deployment file packaging tool packages a network modal source file and a corresponding configuration file into a network modal deployment file.

In the polymorphic intelligent network integration environment, a user writes codes related to a network modal to form a .p4 source code file; at the same time, the user also needs to write a network configuration file (.xml), which mainly involves information such as network topology, network nodes, and network modal deployment parameters; after lexical check, grammar check, behavior simulation, function debugging and resource evaluation, the users carries out a packaging operation, and the integrated environment packages the corresponding source code file and network modal configuration file in the current development project into a network modal deployment file (.par).

(2) The network modal deployment file is imported into a polymorphic intelligent network modal package manager, and the polymorphic intelligent network modal package manager classifies the network modal to be installed into a list of network modals to be installed, displays an "install" button and displays the basic information of a deployment package.

The polymorphic intelligent network package manager is run in a controller server located on a control plane, and the network modal deployment file packaged in step (1) is imported into the manager in a locally importing manner; assuming that the installed network modals are modal1 and modal2, and the imported network modal to be installed is modal3.

In a polymorphic intelligent network package manager interface, the information of deployed network modals will be displayed, including the name, version, installation time and deployment configuration of the network modals. For the deployed network modal, operations such as modification, uninstallation and status query can be performed; at the same time, the information of the imported network modal to be installed, including the name, version, development time, developer of the network modal, will also be displayed and put into the list of network modals to be installed.

(3) The user clicks the "install" button corresponding to the network modal to be installed to enter a network modal installation process.

The network modal to be installed is selected form the list of network modals to be installed, and the user click "install" to enter a network modal installation process; the user pays attention to the installation progress and status by observing the progress bar.

(4) A unified network modal deployment source code file is generated by the polymorphic intelligent network modal package manager from all installed network modal source code files and network modal source code files to be installed, and a network modal configuration file corresponding to a network node equipment is generated for each network node equipment according to a corresponding configuration file;

After entering the network modal installation process, the network modal code automatic integration tool re-unpacks the deployment file (.par) to be installed into a source code file and a network modal configuration file; the network modal code automatic integration tool further integrates the network modal source code file to be installed (.P4) and all the installed network modal source code files (.P4) into a unified network modal source code file according to a source code lexical grammar format (this file integrates all the installed and to-be-installed network modals), for example, the source code files (m1_source.P4, m2_source.P4, m3_source.P4) of the installed network modals modal1, modal2 and the network modal modal3 to be installed are integrated into one source code file, namely, networkmodal_source.P4; at the same time, according to the network topology information, network node information and network modal configuration parameters described in each network modal configuration file, a corresponding network node modal configuration file (.xml) is generated for each node device in the network, for example a network modal configuration file config_node_A.xml for a network node equipment A and a network modal configuration file config_node_B.xml for a network node equipment B; the network node modal configuration file (.xml) involves the name and version number of the network modal to be deployed to the node, and the target hardware platform/forwarding module (a programmable chip, FPGA, CPU, etc.) to be deployed.

(5) The polymorphic intelligent network modal package manager distributes the unified network modal deployment source code and the corresponding configuration file to the network node equipment.

By using the distributed polymorphic intelligent network deployment tool, the network modal source code (.p4) generated in step (4) and the corresponding network node modal configuration file (.xml) are distributed to the corresponding network node equipments, for example, the network modal source code file networkmodal_source.P4 and the network modal configuration file config_node_A.xml for the network node equipment A are distributed to the network node equipment A, and the network modal source code file networkmodal_source.P4 and the network modal configuration file config_node_B.xml for the network node equipment B are distributed to the network node equipment B.

(6) The network node equipment network modal package manager located in the network node equipment transmits the received network modal deployment source code file and the corresponding configuration file to a plurality of forwarding modules;

A data plane network modal package distribution and compilation tool is installed in the operating system of the network node equipment; this tool can transmit the received network modal source code file (.P4) and network node modal configuration file (.xml) to different forwarding modules in network node equipment, including CPU, FPGA, a programmable chip, etc.

(7) The forwarding module compiles the network modal deployment source codes to generate binary bin codes corresponding to the forwarding module.

The network modal source code (.P4) transmitted to each forwarding module of the network node equipment will be compiled according to the network node modal configuration file (.xml) in the corresponding compilation environment; after compilation, the binary bin codes under the corresponding target forwarding module platform will be generated.

(8) The forwarding module loads the binary bin codes to complete the installation and deployment of the network modal.

After the compilation of the target forwarding module platform is finished, the binary codes will be further loaded and the program execution will be started; after start-up, notifications of the success of installation of the network modal of the current target forwarding module and the current network node equipment are fed back stage by stage.

(9) The polymorphic intelligent network modal package manager displays the corresponding network modal status as "installed" and moves the network modal to the list of installed network modals.

After receiving the notification of success of installation of the network modal from all network nodes, the polymorphic intelligent network modal package manager confirms that the network modal has been installed and deployed, and displays the current status as "installed"; at the same time, the network modal will be moved to the list of installed network modals for management.

II, Uninstallation of Network Modal

Figure 4:
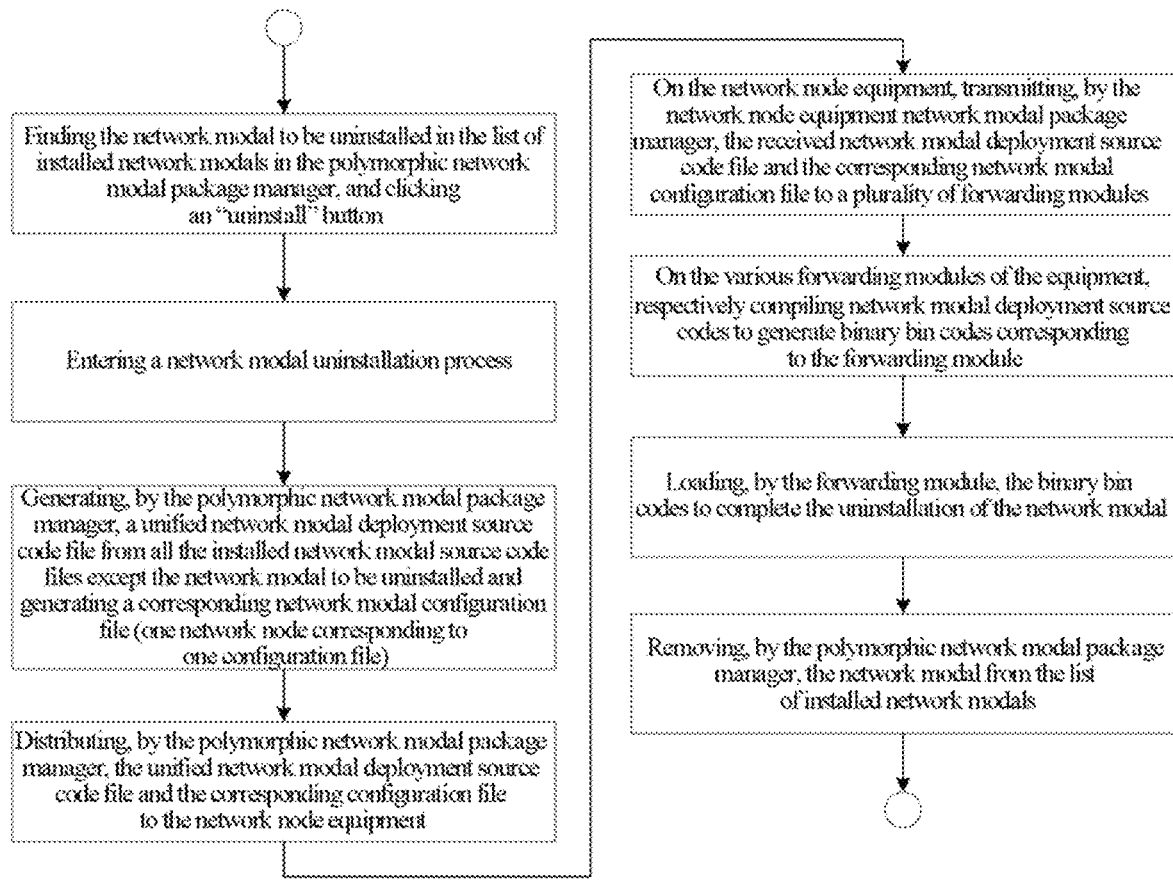
FIG. 4 is a schematic diagram of the uninstallation and removal process of a network modal.

The deployed network modal is removed and uninstalled from the polymorphic intelligent network environment, as shown in FIG. 4, which specifically includes the following sub-steps.

(1) The network modal to be uninstalled is found in the list of installed network modals in the polymorphic intelligent network modal package manager, and the "uninstall" button is clicked;

the polymorphic intelligent network modal package manager running in the controller server displays the list of "installed network modals"; each item in the list corresponds to a network modal that has been installed in the current network; the user selects the network modal item to be uninstalled, and clicks the corresponding "uninstall" button; assuming that the deployed network modals are modal1, modal2 and modal3, and modal2 to be uninstalled.

(2) Enter a network modal uninstallation process;

The user clicks to confirm the uninstallation operation to start and enter the network modal uninstallation process; at the same time, the uninstallation progress status information is displayed.

(3) A unified network modal deployment source code file is generated from all the installed network modal source code files except the network modal to be uninstalled by the network modal code automatic integration tool of the polymorphic intelligent network modal package manager, and a network modal configuration file corresponding to the network node equipment is generated for each network node equipment according to the corresponding configuration file (one network node corresponds to one configuration file);

after entering the network modal uninstallation process, the network modal code automatic integration tool re-unpacks all the installed network modal deployment files (.par) except the network modal to be unloaded into a source code file and a network modal configuration file; the network modal code automatic integration tool further integrates these unpacked network modal source code files (.P4) into a new and unified network modal source code file according to the source code lexical grammar format (this file concentrates all installed network modals except the network modal to be uninstalled),for example integrating the source code files (m1_source.P4, m3_source.P4) of all installed network modals modal1 and modal3 except the network modal modal2; at the same time, according to the network topology information, network node information and network modal configuration parameters described in each network modal configuration file, a corresponding network node modal configuration file (.xml) is generated for each node device in the network; the network node modal configuration file (.xml) involves the name and version number of the network modal to be deployed to the node, and the target hardware platform/forwarding module (a programmable chip, FPGA, CPU, etc.) to be deployed.

(4) The polymorphic intelligent network modal package manager distributes the unified network modal deployment source code file and the network modal configuration file corresponding to the network node equipment to the network node equipment;

By using the distributed polymorphic intelligent network deployment tool, the network modal source code (.P4) generated in step (3) and the corresponding network node modal configuration file (.xml) are distributed to the corresponding network node equipments, for example, the network modal source code file networkmodal_source.P4 and network modal configuration file config_node_A.xml for the network node equipment A are distributed to the network node equipment A, and the network modal source code file networkmodal_source.P4 and the network modal configuration file config_node_C.xml for the network node equipment C are distributed to the network node equipment C.

(5) The network node equipment network node equipment network modal package manager transmits the received network modal deployment source code file and the corresponding network modal configuration file to a plurality of forwarding modules;

A data plane network modal package distribution and compilation tool is installed in the operating system of the network node equipment; this tool can transmit the received network modal source code (.P4) and network node modal configuration file (.xml) to different forwarding modules in network node equipment, including CPU, FPGA, a programmable chip, etc.

(6) The forwarding module compiles the network modal deployment source codes to generate binary bin codes corresponding to the forwarding module.

The network modal source code (.P4) transmitted to each forwarding module of the network node equipment will be compiled according to the network node modal configuration file (.xml) in the corresponding compilation environment; after compilation, the binary bin codes under the corresponding target forwarding module platform will be generated.

(7) The forwarding module loads the binary bin codes to complete the uninstallation of the network modal;

After the compilation of the target forwarding module platform is finished, the binary codes will be further loaded and the program execution will be started; after start-up, notifications of the success of the uninstallation of the network modal of the current target forwarding module and the current network node equipment are fed back stage by stage.

(8) The polymorphic intelligent network modal package manager removes the network modal from the list of installed network modals.

The polymorphic intelligent network modal package manager displays that the uninstallation process has finished, removes the network modal to be uninstalled from the list of installed network modals, and prompts the user that the network modal has been uninstalled successfully.

III, Modification of Network Modal

Figure 5:
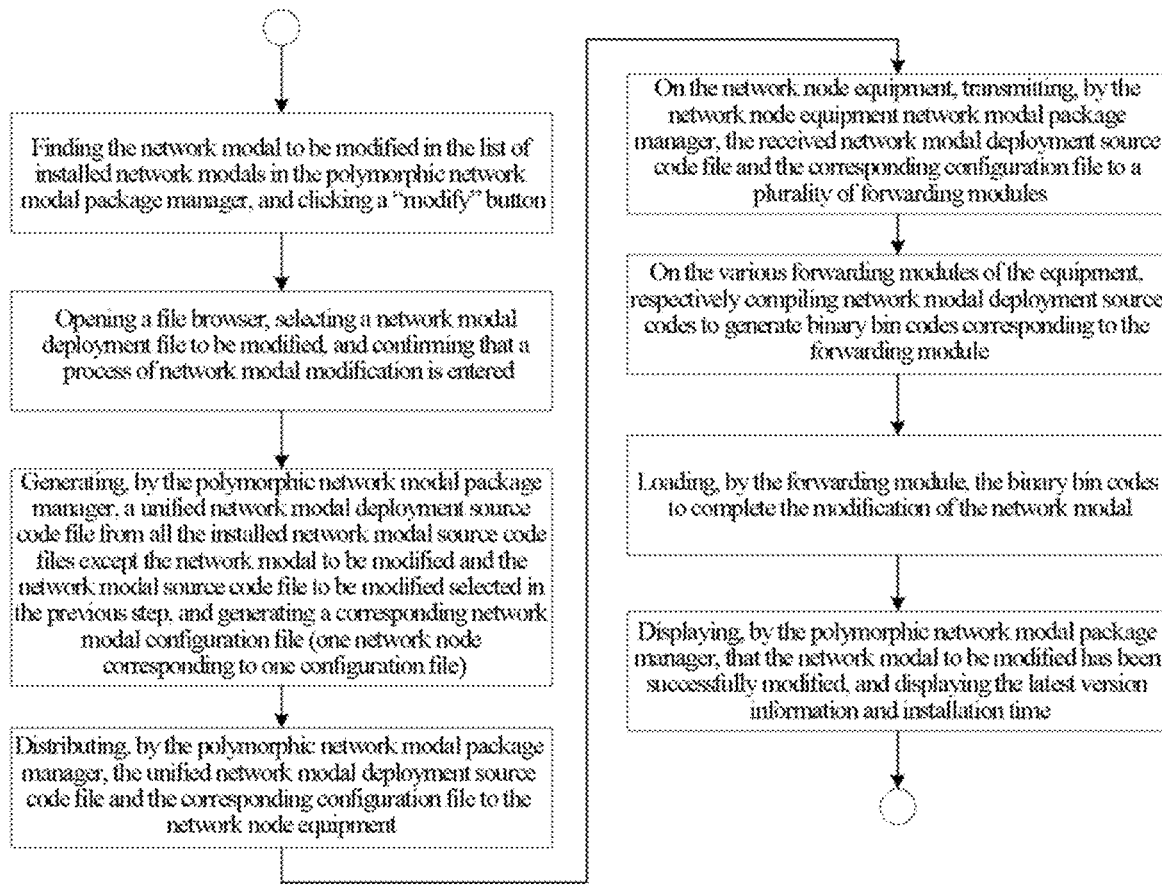
FIG. 5 is a schematic diagram of the modification process of a network modal.

The installed network modal is modified, as shown in FIG. 5, which specifically includes the following sub-steps.

(1) The network modal to be modified is found in the list of installed network modals in the polymorphic intelligent network modal package manager, and a "modify" button is clicked.

The polymorphic intelligent network modal package manager running in the controller server displays the list of installed network modals; the network modal that needs to be modified is found and the "modify" button is clicked to start the network modal modification process; assuming that the installed network modals are modal 1, modal 2 and modal 3, and modal 1 needs to be modified.

(2) A file browser is opened to select the network modal deployment file to be modified, and it is confirmed to enter the network modal modification process;

After entering the network modal modification process, the system will open a file browser for the user to choose the network modal deployment package file (.par) that needs to be upgraded; the system compares the version information of two deployment package files of the same network modal, and prompts the user to modify and confirm the network modal; the user clicks "confirm" to proceed to the next operation.

(3) A unified network modal deployment source code file is generated by the network modal code integration tool from all the installed network modal source code files except the network modal to be modified and the network modal source code file to be modified selected in the previous step, and a network modal configuration file corresponding to the network node equipment is generated for each network node equipment according to the corresponding configuration file (one network node corresponds to one configuration file);

the network modal code automatic integration tool re-unpacks all installed network modals except the network modal to be modified and the deployment file (.par) of the network modal to be modified selected in the previous step into source code files and network modal configuration files; the code integration tool further integrates all the unpacked network modal source code files (.P4) into a unified network modal source code file according to the source code lexical grammar format (this file integrates the network modal to be modified and other installed network modals), for example, the source code files (m2_source.P4, m3_source.P4 and m1_source_new.P4,) of the installed network modals modal2 and modal3 and the network modal modal1 to be modified are integrated into one source code file, namely networkmodal_source.P4; at the same time, according to the network topology information, network node information and network modal configuration parameters described in each network modal configuration file, a corresponding network node modal configuration file (.xml) is generated for each node device in the network, for example a network modal configuration fileconfig_node_A.xml for the network node equipment A and a network modal configuration file config_node_B.xml for the network node equipment B; the network node modal configuration file (.xml) involves the name and version number of the network modal to be deployed to the node, and the target hardware platform/forwarding module (a programmable chip, FPGA, CPU, etc.) to be deployed.

The polymorphic intelligent network modal package manager distributes the unified network modal deployment source code file and the network modal configuration file corresponding to the network node equipment to the network node equipment.

By using the distributed polymorphic intelligent network deployment tool, the network modal source code (.P4) and the specific network node modal configuration file (.xml) generated in step (3) are distributed to the corresponding network node equipment, for example, the network modal source code file networkmodal_source.P4 and the network modal configuration file config_node_A.xml for the network node equipment A are distributed to the network node equipment A, the network modal source code file networkmodal_source.P4 and the network modal configuration file config_node_C.xml for the network node equipment C are distributed to the network node equipment C.

(5) The network node equipment network node equipment network modal package manager transmits the received network modal deployment source code file and the corresponding configuration file to a plurality of forwarding modules.

A data plane network modal package distribution and compilation tool is installed in the operating system of the network node equipment; this tool can transmit the received network modal source code (.P4) and network node modal configuration file (.xml) to different forwarding modules in network node equipment, including CPU, FPGA, a programmable chip, etc.

(6) The forwarding module compiles the network modal deployment source codes to generate a binary bin codes corresponding to the forwarding module. The network modal source code (.P4) transmitted to each forwarding module of the network node equipment will be compiled according to the network node modal configuration file (.xml) in the corresponding compilation environment; after compilation, the binary bin codes under the corresponding target forwarding module platform will be generated.

(7) The forwarding module loads the binary bin codes to complete the modification of the network modal.

After the compilation of the target forwarding module platform is finished, the binary codes will be further loaded and the program execution will be started; after start-up, notifications of the success of the network modal modification of the current target forwarding module and the current network node equipment are fed back stage by stage.

(8) The polymorphic intelligent network modal package manager displays that the network modal to be modified has been successfully modified, and displays the latest version information and installation time.

The polymorphic intelligent network modal package manager displays that the modification process has been finished, and at the same time displays the latest version information and installation time in the list of installed network modals, and prompts the user of the success of the network modal modification.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A network modal management system, comprising a polymorphic intelligent network integrated development environment and a polymorphic intelligent network distributed compilation and deployment environment;
    wherein the polymorphic intelligent network integrated development environment comprises an editor, a modal development auxiliary module and a network modal deployment file packaging tool, wherein the editor provides a user with network modal codes and a configuration file corresponding to the network modal codes to write, and the configuration file covers network topology, deployment nodes and network modal parameters, wherein the modal development auxiliary module provides modal development auxiliary functions for the user to write, debug and test the network modal codes;
    wherein the polymorphic intelligent network distributed compilation and deployment environment comprises a polymorphic intelligent network modal package manager deployed on a network controller server and a network node equipment network modal package manager deployed on a network node equipment;
    wherein the network node equipment network modal package manager comprises a data plane network modal package distribution and compilation tool;
    the network modal management system further comprises:
    at least one processor, and
    a memory configured to store instructions executed by the at least one processor;
    wherein the instructions cause the at least one processor to:
    package a network modal source code file and a configuration file corresponding to the network modal source code file into a network modal deployment file;
    provide a unified management interface and service of a network modal package for a polymorphic intelligent network user, to record and display a deployment status corresponding to the network modal package in a polymorphic intelligent network, to support import and installation of the network modal deployment file, to support uninstallation and modification of an installed network modal, and to coordinate a deployment management operation of the network modal deployment file on a plurality of network node equipments; and
    transmit the network modal deployment file and a network modal configuration file of the network node equipment to a plurality of forwarding module platforms and control compilation and deployment of the network modal deployment file on each of the plurality of forwarding module platforms.

2. The network modal management system according to claim 1, wherein the polymorphic intelligent network modal package manager comprises a network modal code automatic integration tool and a distributed polymorphic intelligent network deployment tool; and wherein the instructions further cause the at least one processor to:
    extract source codes of various network modals from the polymorphic intelligent network modal package manager, unpack to form a network modal source code file and a configuration file corresponding to network modal source code file, perform lexical and grammatical analysis on extracted network modal source codes, automatically integrate a plurality of network modal source code files into a unified network modal deployment source code file; and generate a network modal configuration file of a network node equipment corresponding to each network node equipment according to the extracted configuration file; and
    distribute the unified network modal deployment source code file and the network modal configuration file of a network node equipment corresponding to the unified network modal deployment source code file to each network node equipment according to a network modal configuration, and monitor network modal deployment of each network node equipment in a data plane.

3. The network modal management system according to claim 1, wherein the instructions further cause the at least one processor to perform lexical check, syntax check, behavior simulation, function debugging and resource evaluation on the written network modal codes.

4. A network modal management method implemented based on a network modal management system, wherein the network modal management system comprises a polymorphic intelligent network integrated development environment and a polymorphic intelligent network distributed compilation and deployment environment;
    wherein the polymorphic intelligent network integrated development environment comprises an editor, a modal development auxiliary module and a network modal deployment file packaging tool, wherein the editor provides a user with network modal codes and a configuration file corresponding to the network modal codes to write, and the configuration file covers network topology, deployment nodes and network modal parameters, wherein the modal development auxiliary module provides modal development auxiliary functions for the user to write, debug and test the network modal codes;
    wherein the polymorphic intelligent network distributed compilation and deployment environment comprises a polymorphic intelligent network modal package manager deployed on a network controller server and a network node equipment network modal package manager deployed on a network node equipment;
    wherein the network node equipment network modal package manager comprises a data plane network modal package distribution and compilation tool;
    the network modal management system further comprises:
    at least one processor, and a memory configured to store instructions executed by the at least one processor;

wherein the instructions cause the at least one processor to:

package a network modal source code file and a configuration file corresponding to the network modal source code file into a network modal deployment file;

provide a unified management interface and service of a network modal package for a polymorphic intelligent network user, to record and display a deployment status corresponding to the network modal package in a polymorphic intelligent network, to support import and installation of the network modal deployment file, to support uninstallation and modification of an installed network modal, and to coordinate a deployment management operation of the network modal deployment file on a plurality of network node equipments; and transmit the network modal deployment file and a network modal configuration file of the network node equipment to a plurality of forwarding module platforms and control compilation and deployment of the network modal deployment file on each of the plurality of forwarding module platforms;

the method comprises:

step (1) installation of the network modal comprises: installing and deploying a user-defined network modal to a network node equipment in a polymorphic intelligent network environment in a distributed manner;

step (2) uninstallation of the network modal comprises: removing the installed network modal from the polymorphic intelligent network environment; and step (3) modification of the network modal comprises: modifying the installed network modal.

5. The network modal management method according to claim 4, wherein the installation of the network modal comprises:

sub-step (11) packaging, by the network modal deployment file packaging tool, a network modal source code file and a configuration file corresponding to the network modal source code file into a network modal deployment file;

sub-step (12) importing the network modal deployment file into a polymorphic intelligent network modal package manager, and classifying, by the polymorphic intelligent network modal package manager, a network modal to be installed into a list of network modals to be installed, displaying an "install" button, and displaying basic information of a deployment package;

sub-step (13) clicking, by a user, the "Install" button corresponding to the network modal to be installed to enter a network modal installation process;

sub-step (14) generating, by the polymorphic intelligent network modal package manager, a unified network modal deployment source code file from all installed network modal source code files and network modal source code files to be installed, and generating, according to a configuration file corresponding to the unified network modal deployment source code file, a network modal configuration file corresponding to a network node equipment for each network node equipment;

sub-step (15) distributing, by the polymorphic intelligent network modal package manager, the unified network modal deployment source code file and the network modal configuration file of a network node equipment corresponding to the unified network modal deployment source code file to the network node equipment;

sub-step (16) transmitting, by a network node equipment network modal package manager located on the network node equipment, a received network modal deployment source code file and a configuration file corresponding to the received network modal deployment source code file to a plurality of forwarding modules;

sub-step (17) compiling, by the plurality of forwarding modules, network modal deployment source codes to generate binary bin codes corresponding to the forwarding modules;

sub-step (18) loading, by the forwarding module, the binary bin codes to complete installation and deployment of the network modal; and sub-step (19) displaying, by the polymorphic intelligent network modal package manager, a corresponding network modal status as "installed" and moving the network modal to a list of installed network modals.

6. The network modal management method according to claim 4, wherein the uninstallation of the network modal comprises:

sub-step (21) finding a network modal to be uninstalled in a list of installed network modals in the polymorphic intelligent network modal package manager, and clicking an "uninstall" button;

sub-step (22) entering a network modal uninstallation process;

sub-step (23) generating, by the polymorphic intelligent network modal package manager, a unified network modal deployment source code file from all installed network modal source code files except the network modal to be uninstalled, and generating, according to a configuration file corresponding to the unified network modal deployment source code file, a network modal configuration file corresponding to a network node equipment for each network node equipment;

sub-step (24) distributing, by the polymorphic intelligent network modal package manager, the unified network modal deployment source code file and the network modal configuration file corresponding to the network node equipment to the network node equipment;

sub-step (25) transmitting, by the network node equipment network modal package manager located on the network node equipment, a received network modal deployment source code file and the network modal configuration file corresponding to the received network modal deployment source code file to a plurality of forwarding modules;

sub-step (26) compiling, by the plurality of forwarding module, network modal deployment source codes to generate binary bin codes corresponding to the forwarding modules;

sub-step (27) loading, by the forwarding modules, the binary bin codes to complete the uninstallation of the network modal; and sub-step (28) removing, by the polymorphic intelligent network modal package manager, the network modal from the list of installed network modals.

7. The network modal management method according to claim 4, wherein the modification of the network modal comprises:

sub-step (31) finding a network modal to be modified in a list of installed network modals in the polymorphic intelligent network modal package manager, and clicking a "modify" button;

sub-step (32) opening a file browser, selecting a network modal deployment file to be modified, and confirming that a process of network modal modification is entered;

sub-step (33) generating, by the polymorphic intelligent network modal package manager, a unified network modal deployment source code file from all the installed network modal source code files except the network modal to be modified and a network modal source code file to be modified selected in the sub-step (32), and generating, according to a configuration file corresponding to the unified network modal deployment source code file, a network modal configuration file corresponding to a network node equipment for each network node equipment;

sub-step (34) distributing, by the polymorphic intelligent network modal package manager, the unified network modal deployment source code file and the network modal configuration file corresponding to the network node equipment to the network node equipment;

sub-step (35) transmitting, by the network node equipment network modal package manager of the network node equipment, a received network modal deployment source code file and a configuration file corresponding to the received network modal deployment source code file to a plurality of forwarding modules;

sub-step (36) compiling, by the forwarding module, network modal deployment source codes to generate binary bin codes corresponding to the forwarding module;

sub-step (37) loading, by the forwarding module, the binary bin codes to complete the modification of the network modal; and sub-step (38) displaying, by the polymorphic intelligent network modal package manager, that the network modal to be modified has been successfully modified, and displaying latest version information and installation time.

8. The network modal management method according to claim 5, wherein in the step (14) of the installation of the network modal, the network modal code automatic integration tool in the polymorphic intelligent network modal package manager re-unpacks the network modal deployment file corresponding to the network modal to be installed into a network modal source code file and a configuration file, and integrates the network modal source code file to be installed and all the installed network modal source code files into a new unified network modal deployment source code file according to a source code lexical grammar format.

9. The network modal management method according to claim 6, wherein in the step (23) of the uninstallation of a network modal, the network modal code automatic integration tool in the polymorphic intelligent network modal package manager re-unpacks all installed network modal deployment files except the network modal to be uninstalled into network modal source code files and configuration files, and integrates the re-unpacked network modal source code files into a new unified network modal deployment source code file according to a source code lexical grammar format.

10. The network modal management method according to claim 7, wherein in the sub-step (33) of the modification of the network modal, the network modal code automatic integration tool in the polymorphic intelligent network modal package manager re-unpacks all installed network modal deployment files except the network modal to be modified and the network modal deployment file to be modified selected in the sub-step (32) into network modal source code files and configuration files, and integrates the re-unpacked network modal source code files into a new unified network modal deployment source code file according to a source code lexical grammar format.

* * * * *